United States Patent
Sutehall et al.

(10) Patent No.: US 7,151,878 B2
(45) Date of Patent: Dec. 19, 2006

(54) INSTALLING AN OPTICAL FIBRE CABLE IN A DUCT

(75) Inventors: Ralph Sutehall, Newport (GB); Martin Vincent Davies, Newport (GB)

(73) Assignee: Pirelli General Plc, London (GB)

(*) Notice: Subject to any disclaimer, the term of this patent is extended or adjusted under 35 U.S.C. 154(b) by 0 days.

(21) Appl. No.: 10/478,430

(22) PCT Filed: Apr. 25, 2002

(86) PCT No.: PCT/GB02/01918

§ 371 (c)(1),
(2), (4) Date: Nov. 21, 2003

(87) PCT Pub. No.: WO02/095472

PCT Pub. Date: Nov. 28, 2002

(65) Prior Publication Data

US 2004/0156600 A1    Aug. 12, 2004

(30) Foreign Application Priority Data

May 23, 2001  (EP)  ................... 01304552

(51) Int. Cl.
*G02B 6/44* (2006.01)
(52) U.S. Cl. ...................................................... 385/100
(58) Field of Classification Search ................ 385/100; 254/134.4

See application file for complete search history.

(56) References Cited

U.S. PATENT DOCUMENTS 5,738,338 A * 4/1998 Sutehall ................... 254/134.4
6,409,155 B1 * 6/2002 Brown et al. ............. 254/134.4

FOREIGN PATENT DOCUMENTS

EP    0 108 590 A1    5/1984
EP    0 770 894 A1    5/1997

* cited by examiner

*Primary Examiner*—Javaid H. Nasri
(74) *Attorney, Agent, or Firm*—Finnegan, Henderson, Farabow, Garrett & Dunner, L.L.P.

(57) ABSTRACT

The apparatus has a feed mechanism engageable with the optical fibre cable for feeding the cable toward the duct, a mechanism for directing a gaseous flow into the duct for propelling the optical fibre cable along the duct and a drying mechanism disposed upstream of the cable feed device for removing moisture that may be present on an exterior surface of the duct.

30 Claims, 2 Drawing Sheets

INSTALLING AN OPTICAL FIBRE CABLE IN A DUCT

CROSS REFERENCE TO RELATED APPLICATIONS

This application is a national phase application based on PCT/GB02/01918, filed Apr. 25, 2002, the content of which is incorporated herein by reference, and claims the priority of European Patent Application No. 01304552.1, filed May 23, 2001, the content of which is incorporated herein by reference.

BACKGROUND OF THE INVENTION

1. Field of the Invention

The invention relates to installing an optical fibre cable in a duct and more particularly to installing an optical fibre cable in a duct by propelling the cable along the duct by means of a gas flow.

2. Description of the Related Art

The installation of optical fibre cables using a gas to propel the cable along a duct, which can be referred to as 'blown cable installation', is known. Blown installation of optical fibres is, for example, disclosed in EP-A-0108590 and EP-A-0770894.

The introduction of the blown cable installation process has led to the design of specialised small lightweight equipment, which is used to propel an optical fibre cable along a duct. The main component of such equipment is referred to as the blowing head, which comprises a cable guide, a hydraulically driven caterpillar capstan and an air box. The air box is where the optical fibre cable and compressed air, at approximately 13 Bar, are introduced into a duct along which the cable is to be fed. The caterpillar capstan is positioned upstream of the air box and is arranged to pull the optical fibre cable from a cable drum and assist its feed into the duct. The capstan typically consists of opposed belts that comprise rubber blocks mounted on a chain and are driven at speeds of up to 60 m/min.

An important parameter for determining the distance an optical fibre line can be installed by the blown cable installation process is the amount of push force, or assist, provided by the caterpillar capstan. Where the compressed air and fibre line are introduced into the duct, there is a dead zone at which the air flow is insufficient to propel the cable along the duct. The caterpillar capstan pushes the optical fibre line through the dead zone to enable installation to take place.

When planning an installation, the maximum blowing distance must be taken into account. Should this distance prove unachievable in practice, considerable extra work is required to complete the installation. If the installer takes a cautious approach and does not attempt installation over the maximum blowing distance, the number of installation procedures is increased thereby increasing the overall cost of the installation.

One reason the maximum blowing distance may not be achieved is that the level of the assist provided by the caterpillar capstan may be reduced if the outer surface of the optical fibre cable is wet. If the cable is wet, the moisture it carries is wiped off by the belts of the caterpillar capstan, which eventually become saturated causing them to slip over the cable. The resultant loss of friction between the optical fibre cable and the belts leads to a reduction in the assist provided by the caterpillar capstan and can result in the maximum blowing distance not being achieved. This problem is particularly likely to occur if the installation takes place in the open during wet weather conditions.

An object of the invention is to at least partially overcome this problem.

SUMMARY OF THE INVENTION

The invention provides a method of installing an optical fibre cable in a duct, said method comprising the steps of engaging said optical fibre cable at a position upstream of said duct so as to apply a pushing force causing said optical fibre cable to move in the direction of said duct, supplying a gaseous flow to propel said optical fibre cable along the duct and drying said optical fibre cable at a position upstream of said position at which said cable is engaged, so as to at least partially remove moisture which may be present on an exterior surface of said cable.

The invention also includes apparatus for installing an optical fibre cable in a duct, said apparatus comprising feed means engageable with said optical fibre cable for feeding said cable towards said duct, means for directing a gaseous flow into said duct for propelling said optical fibre cable along the duct and drying means disposed upstream of said feed means for removing moisture that may be present on an exterior surface of said duct.

The invention also includes apparatus for installing an optical fibre cable in a duct, said apparatus comprising a feed mechanism arranged to engage said optical fibre cable and feed said cable towards said duct, a device arranged to direct a gaseous flow into said duct to blow said optical fibre cable into said duct, and a dryer disposed upstream of said feed mechanism and arranged to cause an exterior surface of said optical fibre cable to be at least partially dried of any moisture that may be present on said exterior surface.

The invention also includes a blown optical fibre installation comprising a supply of optical fibre cable; a duct; an air propulsion unit releasably connected to an end of said duct and defining a flow passage for said optical fibre cable leading into said end of the duct, said propulsion unit further defining at least one air supply passage leading into said flow passage for supplying a flow of pressurised air into said flow passage; a feeder comprising opposed optical fibre engaging elements arranged to feed said optical fibre cable into said flow passage towards said end of the duct; a dryer arranged to direct an airflow at said optical fibre cable at a position upstream of said feeder; and a source of pressurised air connected with the or each said air supply passage and said dryer.

The invention also includes apparatus for installing an optical fibre cable in a duct, said apparatus comprising a gas propulsion unit for propelling said optical fibre cable along said duct, a feeder disposed upstream of said propulsion unit for feeding said cable towards said duct and a drying device positioned upstream of said feeder and arranged to at least partially remove any moisture present on an outer surface of said cable.

BRIEF DESCRIPTION OF THE DRAWINGS

In order that the invention may be well understood, an embodiment thereof, which is given by way of example only, will now be described with reference to the drawings, in which.

DETAILED DESCRIPTION OF THE INVENTION

Figure 1:
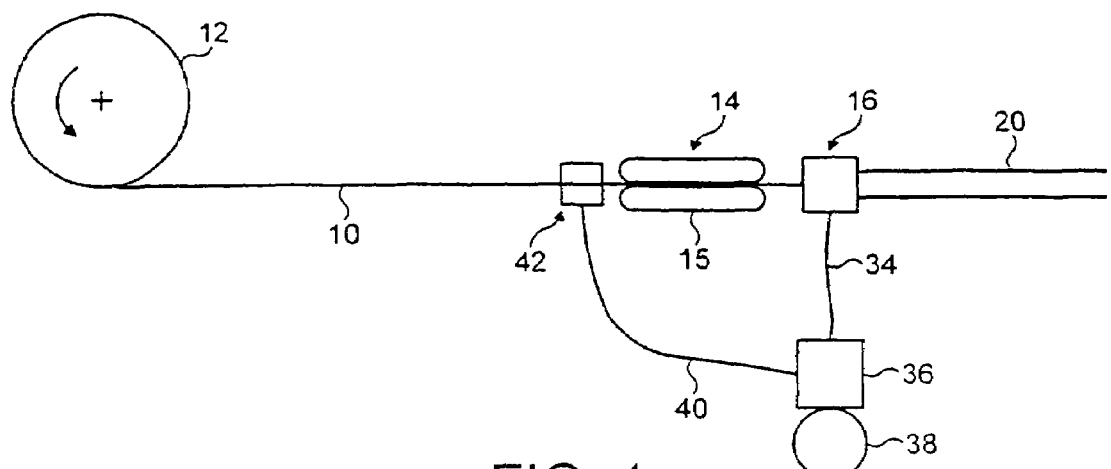
FIG. 1 is a schematic illustration of a blown fibre installation process.

Referring to FIG. 1, an optical fibre cable 10 is fed from a cable drum 12 to a cable feed device, or caterpillar capstan, 14. The cable feed device comprises two opposed endless belts 15, which are driven by hydraulic means (not shown). The belts 15 may be in the form of continuous rubber belts, or rubber blocks linked by chains, or the like, so as to define a continuous belt. The belt engages opposite sides of the cable 10, pulling the cable from the drum and feeding it toward an air propulsion unit, or airbox, 16.

Figure 4:
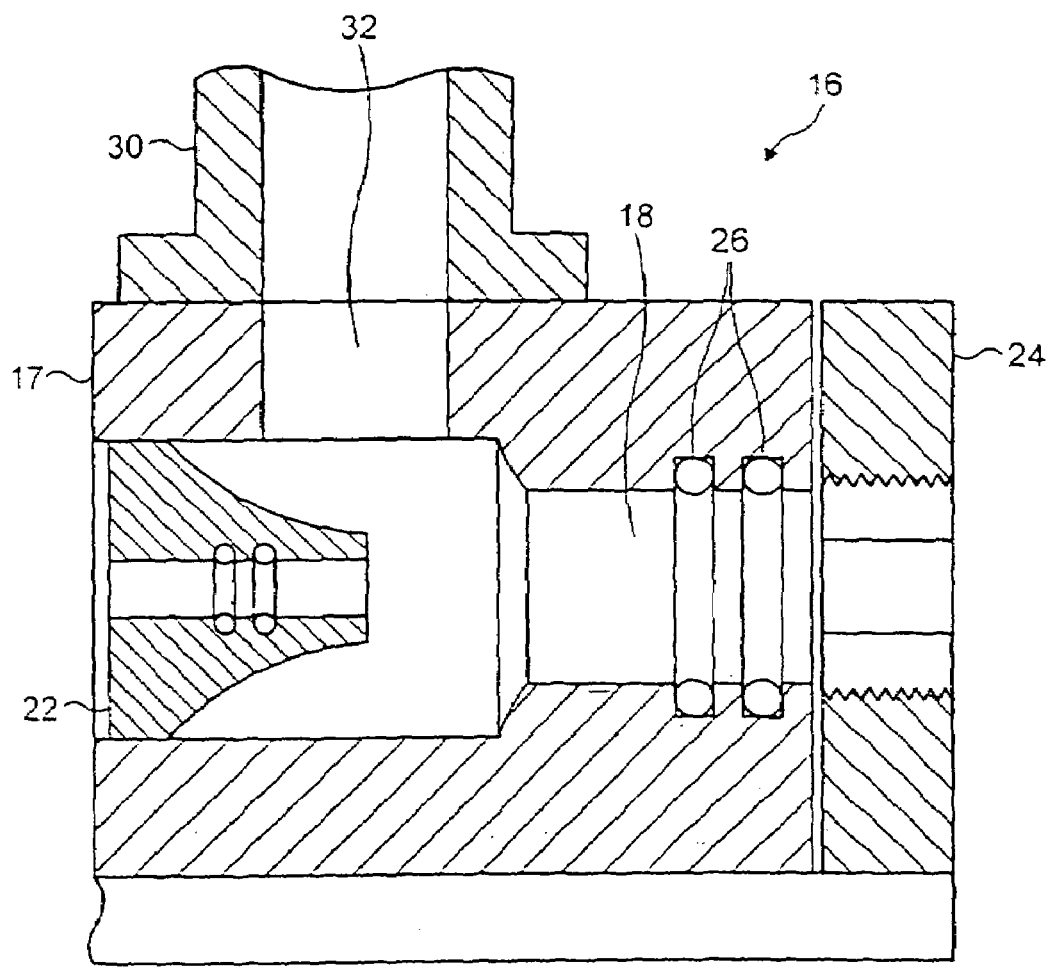
FIG. 4 is sectional view of an air propulsion unit for propelling the cable in the process illustrated by FIG. 1.

The air propulsion unit 16, as best seen in FIG. 4, comprises a body 17 that defines a flow path, or flow passage, 18 along which the cable is fed into the duct 20 (FIG. 1) into which it is to be installed. A cable guide 22 is provided in the upstream end of the passage 18 and a clamping unit 24, for releasably clamping the body to the duct 20, is provided at the downstream end of the passage. O-ring seals 26 are provided in the downstream end of the passage 18 for sealing against an end of the duct. An air inlet 30 is provided on the body 17 in flow communication with air hole 32, the downstream end of which opens into the passage 18. The air inlet is provided with a suitable adapter (not shown) to permit connection to an airline 34 (FIG. 1).

The air propulsion unit 16 can include a speed and length counter and means for monitoring and/or controlling the air flow into the passage 18. The precise configuration of the air propulsion unit 16 is not a feature of the invention and therefore the unit will not be described in any further detail herein. One unit which has been found suitable in practice is produced by Plummettaz SA of ZI En Vannel C, CH-1880 BEX, Switzerland.

The airline 34 is connected to the reservoir 36 of a compressor 38. Air, typically at a pressure of 12 to 13 Bar, is supplied to the air propulsion unit via the airline 34.

Figure 2:
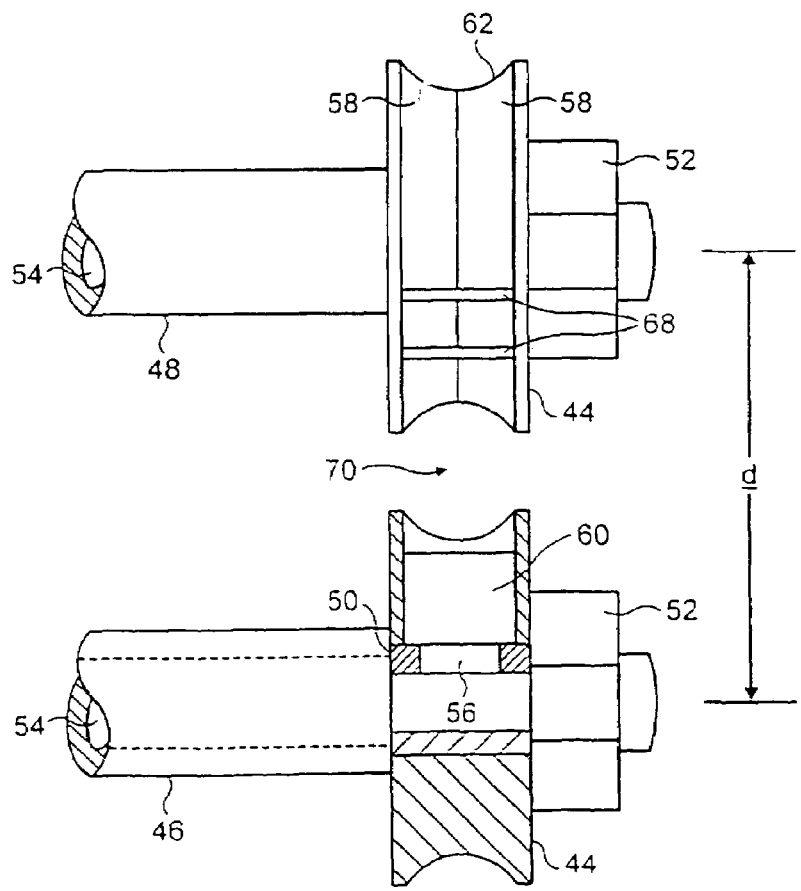
FIG. 2 is a part sectional front elevation of a cable dryer for the process illustrated in FIG. 1.

A second airline 40 leads from the reservoir 36 to a cable dryer 42 that is positioned just upstream of the belts 15. The cable dryer 42, as best seen in FIG. 2, comprises two discs 44, which are mounted on respective non-rotatable shafts 46, 48. The discs sit on a reduced diameter portion of the shafts against respective shoulders 50 and are secured in place by nuts 52. Each shaft 46, 48 has an axially extending passage 54 leading to a transverse aperture 56.

Each disc 44 comprises two cup-like elements 58 pressed one against the other to define a hollow interior, or chamber, 60. The chamber 60 is in flow communication with the aperture 56 of the shaft on which it is mounted. The cup-like elements 58 each have an arcuate recess extending circumferentially thereof such that the assembled discs have a groove 62 extending therearound, the groove cross-section being generally semi-circular. The discs each have a plurality of widthwise extending slits 68 that lead radially inwardly from the groove surface to the chamber 60 and are distributed at intervals around the circumference of the discs.

At least one of the shafts 46, 48 is mounted so as to be moveable to permit the distance d between the axes of the shafts to be adjusted to take account of different sizes of cable. Adjustment could, for example, be provided by means of mounting to a fixed reference body via elongate slots or on pivot arms (not shown). These and many alternative methods of mounting the shafts and providing for adjustment of distance d will be apparent to the skilled person and therefore not described in any detail herein.

Figure 3:
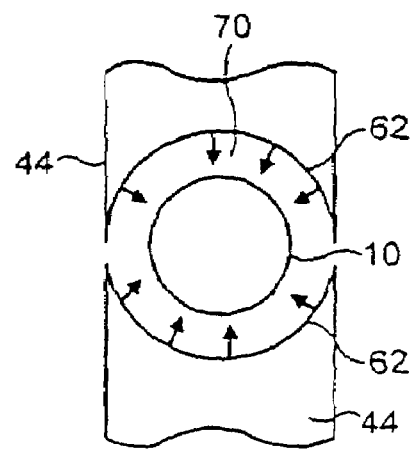
FIG. 3 is a schematic illustration of the cable dryer in operation.

In operation, the air propulsion unit is secured to an upstream end of the duct which is, for example, made of HDPE with a low friction liner, and for a cable of overall diameter 12.9 mm could have an internal diameter of 20 mm and an external diameter of 25 mm. Cable 10 is led from the drum 12 through a space 70 between the discs 44 to the upstream end of the belts 15. As shown in FIG. 3, the distance d is set such that the cable passes through the space 70 without contacting the discs. The belts engage the exterior surface of the cable and when activated draw the cable from the drum and feed it into the cable guide 22, which guides it into the passage 18. Air from the reservoir 36, typically at 12–13 Bar, is directed into the passage 18 via the airhole 32. Feed of the cable into the duct is initially maintained by means of the pushing force provided by the belts until someway into the duct, when the airflow becomes the primary force propelling the cable along the duct. Thus over a first portion of the duct the belts provide the driving force for the cable until the air pressure differential is sufficient for the airflow to drive the cable.

Air is also supplied to the dryer 42 via the airline 40. This airline can be split at its downstream end so as to connect separately with the shaft passages by way of any suitable connection (not shown). Alternatively, the airline could feed into a manifold which jointly feds the two passages. In either case, air from the airline, which is typically at a pressure of 6 to 8 Bar, is directed along the passages 54 and into the chambers 60 via the transverse apertures 56. The pressurised air exits the chambers via the slits 68 in the form of a plurality of airjets which impinge on the exterior surface of the optical fibre cable 10 as it passes through the generally circular section space 70 (FIG. 3) defined between the grooves 62 of the discs. The airjets impinging on the cable surface will remove substantially all of any moisture which may be present on the exterior surface of the cable due to the installation being made in wet weather, or perhaps, the cable having been stored outdoors during wet weather. In either case, the cable entering the feed device 14 will be substantially dry and therefore, the belts should remain substantially dry maintaining the efficiency of the feed device so that the maximum blowing distance should remain achievable.

It is believed that by using the air dryer, a 12.9 mm cable can reliably be blown over a distance of 3.5 km despite installation with a wet cable in wet weather conditions.

It will be appreciated that in addition to the advantage of being able to reliably attain a maximum blowing distance when using wet cable, a further advantage may be obtained where the cable is dry, since the airjets should remove dust and debris from the cable surface that might otherwise collect around the air seals. Furthermore, the dryer should prevent moisture being carried into the air propulsion unit and the duct, thereby retaining a dry air condition, which can be desirable.

It is believed preferable that the air dryer should as far as practicable completely dry the cable prior to its entry into the belts 15. However, substantial advantage may still be obtained if the dryer merely removes a proportion of the water carried by the cable. Factors which are believed to influence the amount of water which may be permitted to remain on the cable are:

1) the wettability of the cable sheath material which determines the amount of water carried by the cable;
2) the wettability of the belt material which determines the amount of water held by the belts;

3) the installation distance, since the longer the distance the greater the amount of water transported into the belts;
4) the route difficulty, since the more torturous the route, the higher is the force required to push the cable along the duct, and
5) belt cleanliness, since a mixture of debris and water on the belts will produce a slurry that will reduce the friction between the belts and the cable thereby reducing the push force provided by the belts.

It will be appreciated that although the belts have been described as made of rubber, other suitable materials may be used. It would also be possible to substitute one or more sets of rubberised wheels for the belts. Furthermore, whilst a hydraulic drive for the belts may be used, it may be possible to drive the belts by means of a suitably geared electric motor.

It will be understood that whilst the discs of the air dryer have been described as being fixed, with a suitable air feed arrangement the shafts carrying the discs could be made rotatable.

It will be appreciated that it is convenient to supply the cable dryer with compressed air from the air source for the air propulsion unit. However other sources of pressurised gas could be used if desired.

The dryer is described as having two discs. It will be appreciated that whilst the grooved discs provide a favourable arrangement for directing a plurality of substantially annular curtains of air at the cable, other arrangements may be used instead. For example, in some circumstances it may be appropriate to arrange one or more nozzles to direct air jets at the cable. These nozzles could optionally be arranged to traverse in the lengthways direction of the cable feed path.

A further alternative to the discs would be to have two elongate bodies which would be mounted in opposed relationship one on each side of the cable. The bodies would each have air distribution apertures distributed along their length. Preferably, each would have a profiled groove extending in the lengthwise direction of the body and the apertures would be slits extending transversely of the groove, analogous to the grooves 62 and slits 68 of the discs of the preferred embodiment. However, discs are the presently preferred embodiment since they are compact and less prone to damage than a pair of elongate bodies.

In the embodiment, the discs are described as having slits 68 evenly distributed around the periphery thereof. It will be understood that this is not essential and the slits may be concentrated in the regions of the discs' peripheries that are to be directed at the cable. Nonetheless, evenly distributed slits are preferred since this makes the cable dryer easier to assemble and provides greater flexibility in terms of the range of diameter of cable that can be handled by a particular dryer. It will also be appreciated that if the mechanism for adjustment of the disc position is pivot arms as described above, or the shafts are made rotatable, slits distributed evenly around the disc circumference are to be preferred.

It will be appreciated that whilst the device or devices used to direct the airflow at the cable may be of many designs, it is advantageous if the arrangement is such that air is directed from more than one direction and preferably, is such that the air passes over the entire surface of the cable.

It is envisaged that dying mediums other than compressed air might be used instead of or to assist the air flow directed at the cable. For example, it may be desirable to direct radiant heat at the cable, although this may not by itself be sufficient to obtain a desired level of dryness without applying undue amounts of heat at the cable and/or slowing feed rate of the cable.

In addition to directing a drying medium at the cable, it may also be desirable to direct air at the belts to remove any moisture which may be picked up by the belts.

It is the presently preferred option to provide a non-contact dryer for drying the optical fiber cable. However, contact drying processes may be used. For example, opposed bodies each carrying an arcuate wiper may be mounted such that the wipers can be brought into contact with the cable periphery so that as the cable is fed forward by the belts, moisture is wiped from the cable surface.

The invention claimed is:

1. A method of installing an optical fibre cable in a duct, said method comprising the steps of engaging said optical fibre cable, by a feed mechanism, at a position upstream, relative to the direction of movement of the cable, of said duct so as to apply a pushing force causing said optical fibre cable to move in the direction of said duct, supplying a gaseous flow to propel said optical fibre cable along the duct and drying said optical fibre cable at a position upstream, relative to the direction of movement of the cable, of said position at which said cable is engaged, so as to at least partially remove moisture which may be present on an exterior surface of said cable.

2. A method as claimed in claim 1, wherein said engaging step comprises engaging said optical fibre cable with endless bands.

3. A method as claimed in claim 2, wherein said drying step comprises directing a drying medium at said optical fibre cable.

4. A method as claimed in claim 1, wherein said drying step comprises directing a drying medium at said optical fibre cable.

5. A method as claimed in claim 4, wherein said drying medium is a gaseous flow, further comprising defining at least one generally annular curtain of said gaseous flow.

6. A method as claimed in claim 5, wherein said drying medium comprises compressed air.

7. A method as claimed in claim 4, wherein said drying medium comprises compressed air.

8. An optical fibre installation comprising an optical fibre cable extending along a duct, which optical cable has been installed by a method as claimed in claim 1.

9. Apparatus for installing an optical fibre cable in a duct, said apparatus comprising feed means engageable with said optical fibre cable for feeding said cable towards said duct, means for directing a gaseous flow into said duct for propelling said optical fibre cable along the duct and drying means disposed upstream, relative to the direction of movement of the cable, of said feed means for removing moisture that may be present on an exterior surface of said cable.

10. Apparatus as claimed in claim 9, wherein said feed means comprises opposed endless bands made of a polymer material.

11. Apparatus as claimed in claim 10, wherein said drying means is a non-contact means that does not contact said optical fibre cable.

12. Apparatus as claimed in claim 9, wherein said drying means is a non-contact drying means that does not contact said optical fibre cable.

13. Apparatus as claimed in claim 12, wherein said non-contact drying means comprises means arranged to direct a gas flow at said exterior surface.

14. Apparatus as claimed in claim 13, wherein said gas flow directing means comprises at least one disc-like body having a portion of a circumferential surface thereof directed at said optical fibre.

15. Apparatus as claimed in claim 14, wherein said gas flow directing means comprises two said bodies arranged in opposed spaced apart relationship such that, in use, said optical fibre cable is fed between such bodies.

16. Apparatus as claimed in claim 15, wherein said at least one body has a circumferentially extending groove defined in said circumferential surface.

17. Apparatus as claimed in claim 14, wherein said at least one body has a circumferentially extending groove defined in said circumferential surface.

18. Apparatus as claimed in claim 17, wherein said at least one body defines a plurality of air outlets which open into said groove.

19. Apparatus as claimed in claim 18, wherein said outlets comprise slits extending transversely of said grooves.

20. Apparatus for installing an optical fibre cable in a duct, said apparatus comprising a feed mechanism arranged to engage said optical fibre cable and feed said cable towards said duct, a device arranged to direct a gaseous flow into said duct to blow said optical fibre cable into said duct, and a dryer disposed upstream, relative to the direction of movement of the cable, of said feed mechanism and arranged to cause an exterior surface of said optical fibre cable to be at least partially dried of any moisture that may be present on said exterior surface.

21. Apparatus as claimed in claim 20, wherein said dryer is a non-contact dryer that does not contact said optical fibre cable.

22. Apparatus as claimed in claim 21, wherein said dryer comprises at least one body arranged to direct a pressurised gaseous flow at said exterior surface.

23. Apparatus as claimed in claim 22, wherein said at least one body is generally disc-like and has a circumferentially extending recess.

24. Apparatus as claimed in claim 23, comprising two said bodies arranged in opposed relationship such that said recesses define an opening through which said optical fibre cable is moved by said feed mechanism.

25. Apparatus as claimed in claim 24, wherein said at least one body defines at least one elongate aperture extending transverse to said recess.

26. Apparatus as claimed in claim 23, wherein said at least one body defines at least one elongate aperture extending transverse to said recess.

27. Apparatus as claimed in claim 20, wherein said gas flow directing device comprises a body having a securing portion by which the body can be releasably secured to an upstream end, relative to the direction of movement of the cable, of said duct and defining a passage along which said optical fibre cable is fed by said feed mechanism, and further defining an opening through which said gaseous flow is directed into said passage.

28. Apparatus as claimed in claim 20, wherein said feed mechanism comprises opposed endless bands.

29. A blown optical fibre installation comprising:
a supply of optical fibre cable;
a duct;
an air propulsion unit releasably connected to an end of said duct and defining a flow passage for said optical fibre cable leading into said end of the duct, said propulsion unit further defining at least one air supply passage leading into said flow passage for supplying a flow of pressurised air into said flow passage;
a feeder comprising opposed optical fibre engaging elements arranged to feed said optical fibre cable into said flow passage towards said end of the duct;
a dryer arranged to direct an airflow at said optical fibre cable at a position upstream, relative to the direction of movement of the cable, of said feeder; and
a source of pressurised air connected with the or each said air supply passage and said dryer.

30. Apparatus for installing an optical fibre cable in a duct, said apparatus comprising a gas propulsion unit for propelling said optical fibre cable along said duct, a feeder disposed upstream, relative to the direction of movement of the cable, of said propulsion unit for feeding said cable towards said duct and a drying device positioned upstream, relative to the direction of movement of the cable, of said feeder and arranged to at least partially remove any moisture present on an outer surface of said cable.

* * * * *